United States Patent
Gursha et al.

(10) Patent No.: US 11,954,422 B2
(45) Date of Patent: Apr. 9, 2024

(54) SYSTEMS AND METHODS FOR STRUCTURE-BASED AUTOMATED HYPERLINKING

(71) Applicant: Rock Cube Holdings LLC, Syracuse, NY (US)

(72) Inventors: Michael Gursha, Chappaqua, NY (US); Douglas Gursha, Chappaqua, NY (US)

(73) Assignee: ROCK CUBE HOLDINGS LLC, Syracuse, NY (US)

( * ) Notice: Subject to any disclaimer, the term of this patent is extended or adjusted under 35 U.S.C. 154(b) by 0 days.

(21) Appl. No.: 17/822,632

(22) Filed: Aug. 26, 2022

(65) Prior Publication Data

US 2023/0062267 A1 Mar. 2, 2023

Related U.S. Application Data

(60) Provisional application No. 63/260,682, filed on Aug. 27, 2021.

(51) Int. Cl.
*G06F 17/00* (2019.01)
*G06F 40/134* (2020.01)

(52) U.S. Cl.
CPC .................. *G06F 40/134* (2020.01)

(58) Field of Classification Search
CPC ..................................................... G06F 40/134
See application file for complete search history.

(56) References Cited

U.S. PATENT DOCUMENTS

| | | | | |
|---|---|---|---|---|
| 5,708,825 | A * | 1/1998 | Sotomayor | G06F 40/30 707/E17.094 |
| 6,098,081 | A * | 8/2000 | Heidorn | G06F 16/94 707/E17.013 |
| 6,295,542 | B1 * | 9/2001 | Corbin | G06F 40/10 715/205 |
| 7,013,309 | B2 * | 3/2006 | Chakraborty | G06F 40/205 715/201 |
| 7,107,535 | B2 * | 9/2006 | Cohen | G06F 3/14 707/E17.116 |
| 7,275,061 | B1 | 9/2007 | Kon et al. | |
| 7,467,349 | B1 * | 12/2008 | Bryar | G06F 16/9577 715/204 |
| 7,809,697 | B1 * | 10/2010 | Kanefsky | G06F 16/9566 707/693 |

(Continued)

FOREIGN PATENT DOCUMENTS

| | | | | |
|---|---|---|---|---|
| CN | 105574162 B | * | 5/2019 | ......... G06F 16/9558 |
| JP | 2008077227 A | | 4/2008 | |

(Continued)

OTHER PUBLICATIONS

ISA Korean Intellectual Property Office, International Search Report and Written Opinion Issued in Application No. PCT/US2022/075523, dated Dec. 6, 2022, WIPO, 9 pages.

*Primary Examiner* — Laurie A Ries
(74) *Attorney, Agent, or Firm* — McCoy Russell LLP

(57) ABSTRACT

A method for automatically inserting hyperlinks is provided. In one example, the method includes determining a location for a hyperlink anchor in a document based on a type of structural element identified in the document. A presentation of the hyperlink anchor may be displayed according to a set of rules defining an appearance of the hyperlink anchor according to the type of structural element.

20 Claims, 16 Drawing Sheets

(56) References Cited

U.S. PATENT DOCUMENTS

| | | | |
|---|---|---|---|
| 7,979,444 B2* | 7/2011 | Ma | G06F 16/9538 |
| | | | 707/723 |
| 8,380,722 B2 | 2/2013 | Dou et al. | |
| 8,566,444 B1* | 10/2013 | Yona | H04L 63/0263 |
| | | | 709/225 |
| 8,683,003 B2* | 3/2014 | Arav | G06F 40/134 |
| | | | 709/228 |
| 9,053,177 B1* | 6/2015 | Seo | G06F 16/951 |
| 9,672,521 B1* | 6/2017 | Stevens | G06F 3/00 |
| 11,768,905 B2* | 9/2023 | Raymond | G06F 16/9566 |
| | | | 707/740 |
| 11,792,222 B2* | 10/2023 | Murray | H04L 63/20 |
| | | | 726/26 |
| 2002/0107884 A1* | 8/2002 | Banerjee | G06F 16/9558 |
| | | | 707/E17.119 |
| 2005/0149576 A1* | 7/2005 | Marmaros | G06F 16/957 |
| 2005/0149851 A1* | 7/2005 | Mittal | G06F 16/9558 |
| | | | 707/E17.116 |
| 2007/0016848 A1* | 1/2007 | Rosenoff | G06F 16/94 |
| | | | 715/205 |
| 2007/0226250 A1* | 9/2007 | Mueller | G06Q 30/04 |
| | | | 707/999.102 |
| 2007/0299986 A1* | 12/2007 | Craig | H04L 61/30 |
| | | | 707/E17.116 |
| 2008/0059451 A1* | 3/2008 | Musgrove | G06F 16/951 |
| | | | 707/999.005 |
| 2009/0012869 A1* | 1/2009 | Henkin | G06Q 30/0273 |
| | | | 705/14.54 |
| 2009/0172002 A1* | 7/2009 | Ahmed | G06F 16/958 |
| | | | 707/999.102 |
| 2009/0287698 A1* | 11/2009 | Marmaros | G06F 16/9558 |
| | | | 707/999.005 |
| 2011/0047153 A1* | 2/2011 | Betz | G06F 16/313 |
| | | | 707/723 |
| 2012/0246561 A1* | 9/2012 | Doig | G06F 16/951 |
| | | | 715/255 |
| 2013/0111315 A1* | 5/2013 | Mendelovich | G06F 40/18 |
| | | | 715/205 |
| 2013/0174002 A1* | 7/2013 | Jones | G06F 16/9558 |
| | | | 715/208 |
| 2013/0325972 A1* | 12/2013 | Boston | G06Q 10/10 |
| | | | 709/204 |
| 2015/0220492 A1* | 8/2015 | Simeonov | G06F 16/972 |
| | | | 715/244 |
| 2015/0254216 A1* | 9/2015 | DeLuca | G06F 40/134 |
| | | | 715/206 |
| 2016/0342591 A1* | 11/2016 | Zholudev | G06F 16/24578 |
| 2018/0129648 A1* | 5/2018 | Chakravarthy | G06F 40/58 |
| 2018/0157629 A1* | 6/2018 | Tuli | H04L 67/5651 |
| 2019/0220487 A1* | 7/2019 | Denninghoff | H03H 9/1092 |
| 2022/0058234 A1* | 2/2022 | Schneider | G06F 3/0483 |

FOREIGN PATENT DOCUMENTS

| | | | | |
|---|---|---|---|---|
| TW | 200417197 A * | 9/2004 | | G06F 17/30884 |
| WO | 2007129288 A2 | 11/2007 | | |
| WO | WO-2013170825 A2 * | 11/2013 | | G06F 3/048 |

* cited by examiner

Scoring Rules
300

The goal in football is to have scored more points than the opponent by the end of all four quarters. There are four different ways that a team can score. The main way of scoring is by entering the opponent's end zone with the ball, which is worth 6 points. If the team scores a touchdown, they have the opportunity to add some extra points by attempting an extra-point kick or a two-point conversion. Ultimately, teams seek to score a touchdown, however, teams can get close to the end zone and still can't score one. In that case, teams can attempt a field goal to add three points to the score. The fourth and least common way of scoring is the safety, which is worth two points.

FIG. 3

PAT

After a touchdown is scored, teams can earn one or two additional points. This is called the PAT or try.

- extra point (kick) – 1 point
- two-point conversion – 2 points

Remember that the line for the extra point kick was moved back from the two yard line to the 15 yard line. This changes it from a 19 yard kick to a 32 yard kick. That's much less of guaranteed kick.

FIG. 4

Football Touchdowns 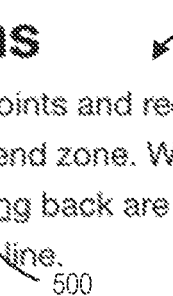

A touchdown in football is worth six points and requires a team to bring the football into the opposing team's end zone. Wide receivers are most likely to score long touchdown. Running back are often used to punch into the endzone from the one or two yard line.
~500

For a touchdown to count a player must remain inbounds with the ball. Touchdowns are worth 6 points.

FIG. 5A

Football Touchdowns 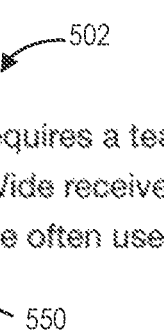

A touchdown in football is worth six points and requires a team to bring the football into the opposing team's end zone. Wide receivers are most likely to score long touchdown. Running backs are often used to punch into the endzone from the one or two yard line.
~550

For a touchdown to count a player must remain inbounds with the ball. Touchdowns are worth 6 points.

FIG. 5B

Football Touchdowns ← 602

A touchdown in football is worth six points and requires a team to bring the football into the opposing team's end zone. Wide receivers are most likely to score long touchdown. Running backs are often used to punch into the endzone from the one or two yard line. ← 604

For a touchdown to count a player must remain inbounds with the ball. Touchdowns are worth 6 points.

FIG. 6A

Football Touchdowns ← 602

A touchdown in football is worth six points and requires a team to bring the football into the opposing team's end zone. Wide receivers are most likely to score long touchdown. Running backs are often used to punch into the endzone from the one or two yard line. ← 604

For a touchdown to count a player must remain inbounds with the ball. Touchdowns are worth 6 points.

FIG. 6B

Touchdown Rules

To score a touchdown, a player must:

- Stay inbounds
- Break the plane of the goal line
- Bring the ball into the end zone
- Catch the ball in the end zone What are the most important rules of football?

1100

1. Catching
2. Fumbles
3. Overtime
4. Scrimmage downs
5. Instant Replays
6. Extra Points
7. Safeties
8. Targeting
9. Touchbacks
10. Onside Kicks

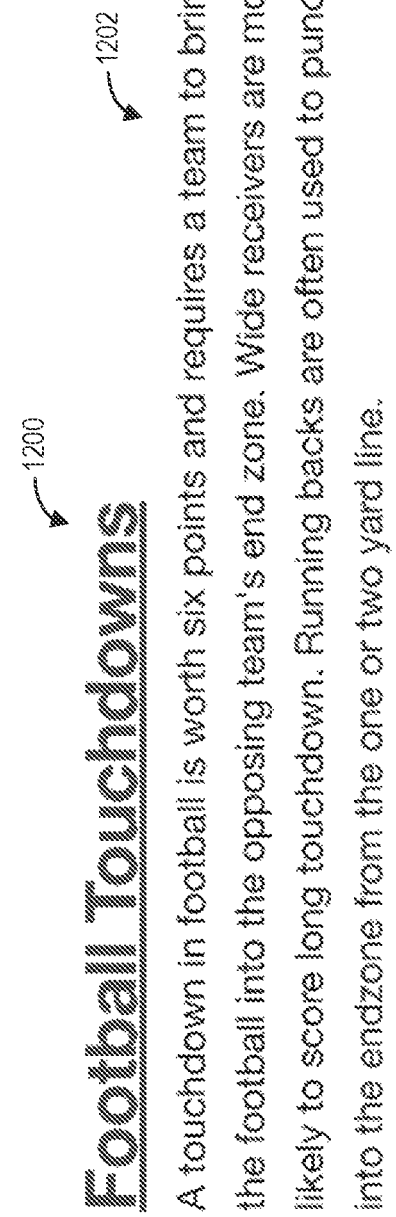

FIG. 12

Football Touchdowns

A touchdown in football is worth six points and requires a team to bring the football into the opposing team's end zone. Wide receivers are most likely to score long touchdown. Running backs are often used to punch into the endzone from the one or two yard line.

For a touchdown to count a player must remain inbounds with the ball. Touchdowns are worth 6 points.

Air Sports List A To Z

| SPORT | DESCRIPTION |
|---|---|
| Aerial Silks | A performance done hanging from fabric attached to the ceiling that shows strength and flexibility. |
| Kite Flying | A sport that involves flying a kite propelled by natural wind. |
| Parachuting | A sport that includes jumping from a high surface and traveling to the ground with the help of a parachute. |
| Paragliding | A sport where someone hangs in a harness below a parachute and glides above the ground. |
| Paramotoring | A sport similar to paragliding, but that uses a motor for propulsion rather than natural wind patterns. |
| Skydiving | A sport where people jump from airplanes high above the ground and fall before deploying a parachute to land safely. |

FIG. 13

Sports Fields Terms

- *Arena*: Indoor enclosure surrounded by seating where sports take place, used for massive sporting events.

- *Field*: Outdoor, grassy, and open land where sporting events take place particularly football, baseball, or soccer.

- *Court*: Indoor or outdoor area with painted sections to denote scoring and boundaries during the game, commonly seen in basketball, tennis, volleyball or racquetball.

- *Rink*: Area made of ice or concrete, used for sports that require skates such as figure skating, roller blading, or hockey.

- *Track*: Flat area with painted lanes used in racing sports.

- *Goal*: The scoring area for football, and soccer. The ball must enter or pass through a goal.

1504 ⟶
Football Passing

1502 ⟶
A player must remain inbounds when catching a pass. A successful catch is called a completion. In the NFL, both feet must be inbounds when catching a pass. In college football, only one foot must be inbounds for a completion. This makes it easier to make touch catches at the college level.

1504 ⟶
Break The Plane

1502 ⟶
The goal line marks the front of the end zone. For a touchdown to count, the ball must go through the goal line. This is called breaking the plane of the goal line.

1504 ⟶
Football Instant Replay

1502 ⟶
Sometimes a touchdown is too close to call. Instant replay may be used to see if the ball went through the goal line, and broke the plane. It can also be used to check if the ball carrier had possession. Every scoring play is reviewed, but a delay in the game only occurs if the reviewing team has to take several looks because it's a close call.

FIG. 15

SYSTEMS AND METHODS FOR STRUCTURE-BASED AUTOMATED HYPERLINKING

CROSS REFERENCE TO RELATED APPLICATIONS

The present application claims priority to U.S. Provisional Application No. 63/260,682 entitled "SYSTEMS AND METHODS FOR STRUCTURE-BASED AUTOMATED HYPERLINKING", filed on Aug. 27, 2021. The entire contents of the above-identified applications are hereby incorporated by reference for all purposes.

FIELD

The disclosure relates generally to automatic display of hyperlinks on a webpage.

BACKGROUND

Rising demand for readily accessible information has driven an increase in publicly available media, such as Internet-based content. Users may rely on websites hosted on the Internet where the websites may be used to consolidate information on a specific topic or range of topics and, in some examples, to find other websites of related content. The websites may include one or more webpages located under a common domain name, and navigation between the webpages of the website, as well as between the website and external websites, may be provided by hyperlinks.

A hyperlink is an HTML element, otherwise known as an anchor, that provides a link from a current electronic document, e.g., as displayed at the website, to other web pages, files, email addresses, locations within the same document, or any other items a URL may address. The new document may be another webpage within the website or a webpage of an external website, e.g., a website belonging to a different domain name. The hyperlink may be located at a relevant point in the document, presented with content indicating the hyperlink's destination that indicates a topic of the linked document. Hyperlinks may also contain other forms of content besides text including HTML elements such as icons, images, and containers. For a website with few pages and a relatively small amount of content, the hyperlinks may be manually inserted (e.g., entered into a coding of the webpage) or may be automatically generated, e.g., using an algorithm for hyperlink generation, based on one or more keywords.

For a large-content website, formed of numerous webpages covering large quantities of information, however, manual entry may be laborious, inefficient and may lead to errors during entry. Keyword-based hyperlink generation may cause a webpage to appear cluttered and render the website less visually appealing. An excessive presence of hyperlinks on a webpage may lessen a likelihood that a user will interact with the hyperlinks, e.g., the user may become desensitized to an abundance of hyperlinks. In contrast, sparse placement of hyperlinks in a webpage with a large amount of information may reduce a visibility of the hyperlinks and the hyperlinks may be lost in the webpage text. As such, finding the hyperlinks on the webpage may become difficult.

In addition, a static characteristic of the hyperlinks may render the hyperlinks obsolete over time. For example, in a webpage with deep links, e.g., links to specific content, a likelihood of the hyperlinks being correctly linked may decrease with time. In some instances, a number of broken or obsolete hyperlinks may increase over time (e.g., linked to no longer existing or altered destinations). A usefulness of the webpage for providing information may thus be degraded as a result of the broken hyperlinks. Manually updating the webpage, however, may be inconvenient and ineffective as maintaining an accuracy of the hyperlinks may demand time-consuming monitoring and searching for migrated target destinations or for new, suitable destinations for the hyperlinks.

It is desired to have systems and methods which customizable and adaptive generation and presentation of hyperlinks to provide more meaningful and useful pathways to locating information.

SUMMARY

A hyperlink generating method is provided to automatically insert hyperlinks. The method includes determining a location for a hyperlink anchor in a document based on a type of structural element identified in the document. In this way, hyperlinks may be strategically positioned within the document to increase a visibility of the hyperlinks and to maintain an organized, and uncluttered aesthetic of the webpage.

In one embodiment, a hyperlink generation engine may be implemented to receive a set of rules input by a user. The hyperlink generation engine may be an automated tool configured with document processing algorithms to automatically insert hyperlinks into an electronic document, such as a webpage. The set of rules may define how the hyperlinks are presented at the webpage according to a type of structural element in which the hyperlink is inserted. For example, structural elements of the webpage may include one or more of a paragraph of text, a list, and a table, and a location. A formatting of the hyperlinks at each of the structural elements may be determined based on the set of rules provided by the user. As such, automatic insertion of the hyperlinks into the webpage may be customized according to user preference, allowing the hyperlinks to be presented in a more discriminating, meaningful manner. Furthermore, the hyperlink generation engine may utilize machine learning and/or artificial intelligence to learn suitable hyperlink placement from a dataset over time. As passage of time increases, the dataset also increases, thereby allowing the hyperlink generation engine to determine target hyperlink placement with increasing accuracy according to user engagement.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 3 shows an example of a structural element of a document in which hyperlinks may be automatically inserted at keywords in paragraphs of text.

FIG. 4 shows a first example of a hyperlinking error generated by a conventional hyperlinking system.

FIG. 5A shows an example of an inaccurate presentation of a hyperlink at a structural element of a document.

FIG. 5B shows an example of a more accurate presentation of the hyperlink of FIG. 5A.

FIG. 6A shows an example of cluttered hyperlink placement in a document.

FIG. 6B shows an example of a more organized hyperlink placement relative to FIG. 6A.

FIG. 9A shows an example of less accurate placement of hyperlinks in a structural element with a pattern.

FIG. 12 shows an example of a structural element into which hyperlinks may be automatically placed, where the structural element is a heading.

FIG. 13 shows an example of a structural element into which hyperlinks may be automatically placed, where the structural element is a table.

FIG. 14 shows an example of a pattern within a structural element into which hyperlinks may be automatically placed, where the pattern is a punctuation mark and the structural element is a bulleted list.

FIG. 15 shows an example of automatic hyperlink generation based on a maximum allowable number of hyperlinks at a visible portion of a document.

DETAILED DESCRIPTION

Figure 1:
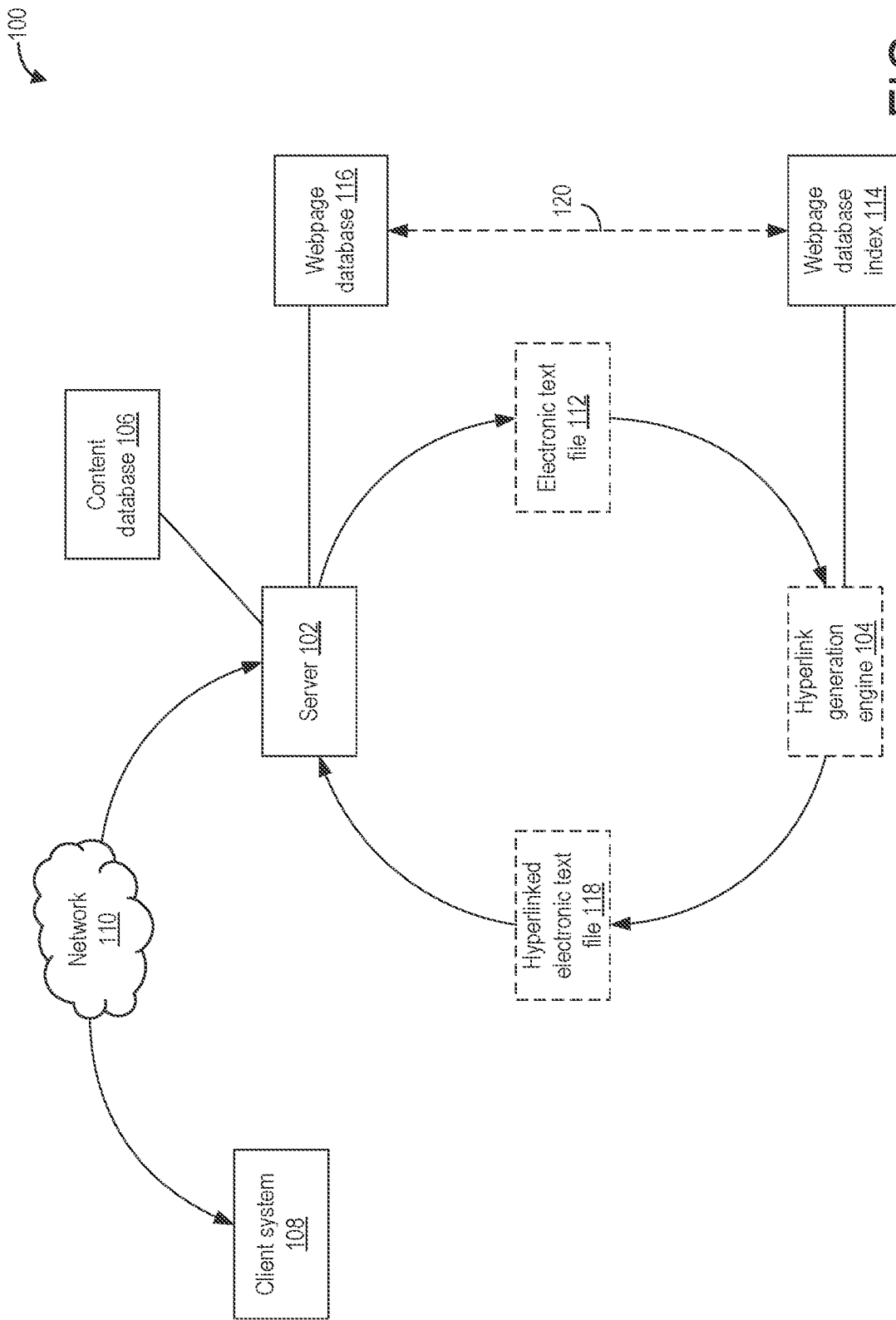
FIG. 1 shows a block diagram of an example hyperlink generation system configured to automatically insert hyperlinks into a document based on user preference via a dynamic hyperlink generation engine.
Figure 2:
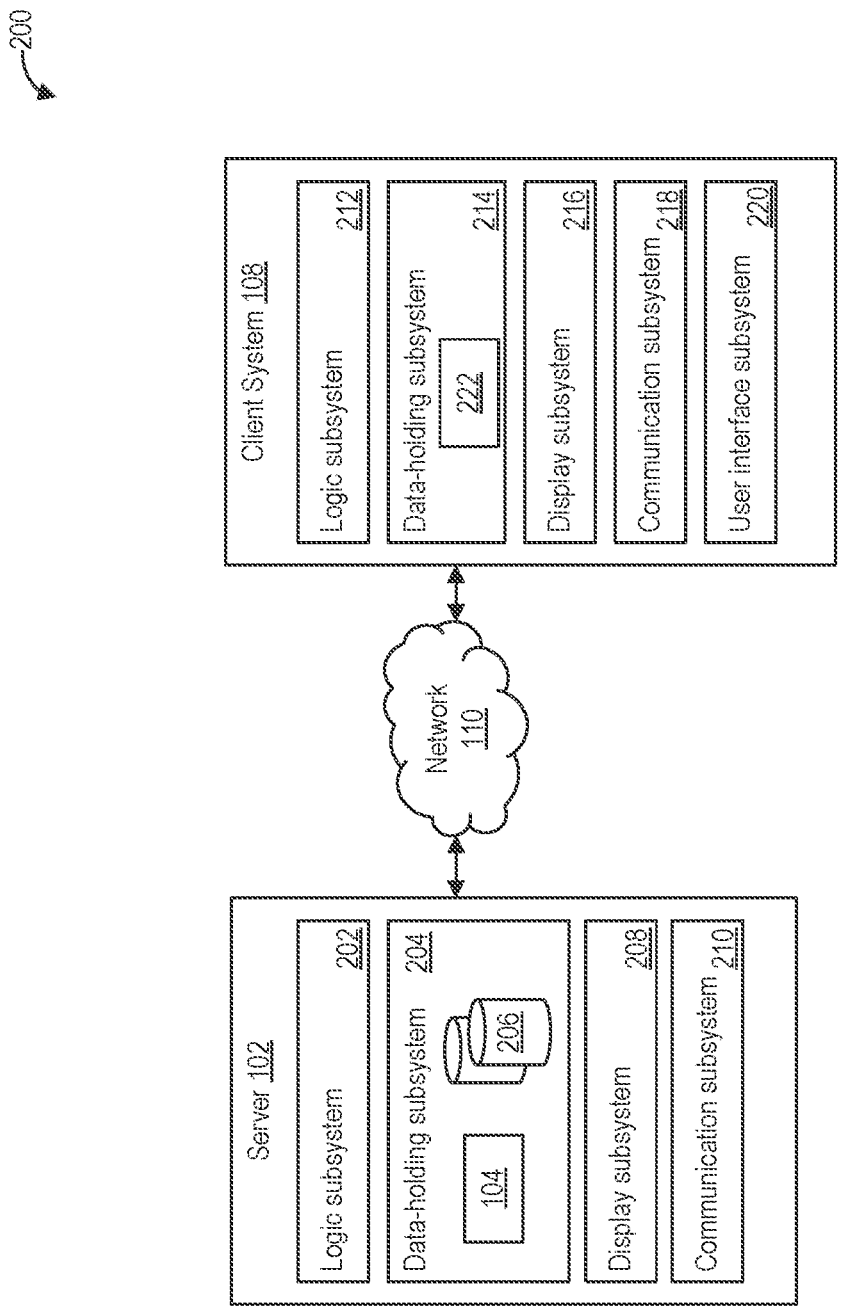
FIG. 2 shows a block diagram of an example networked computing system for automatically generating hyperlinks via the dynamic hyperlink generation engine.
Figure 16:
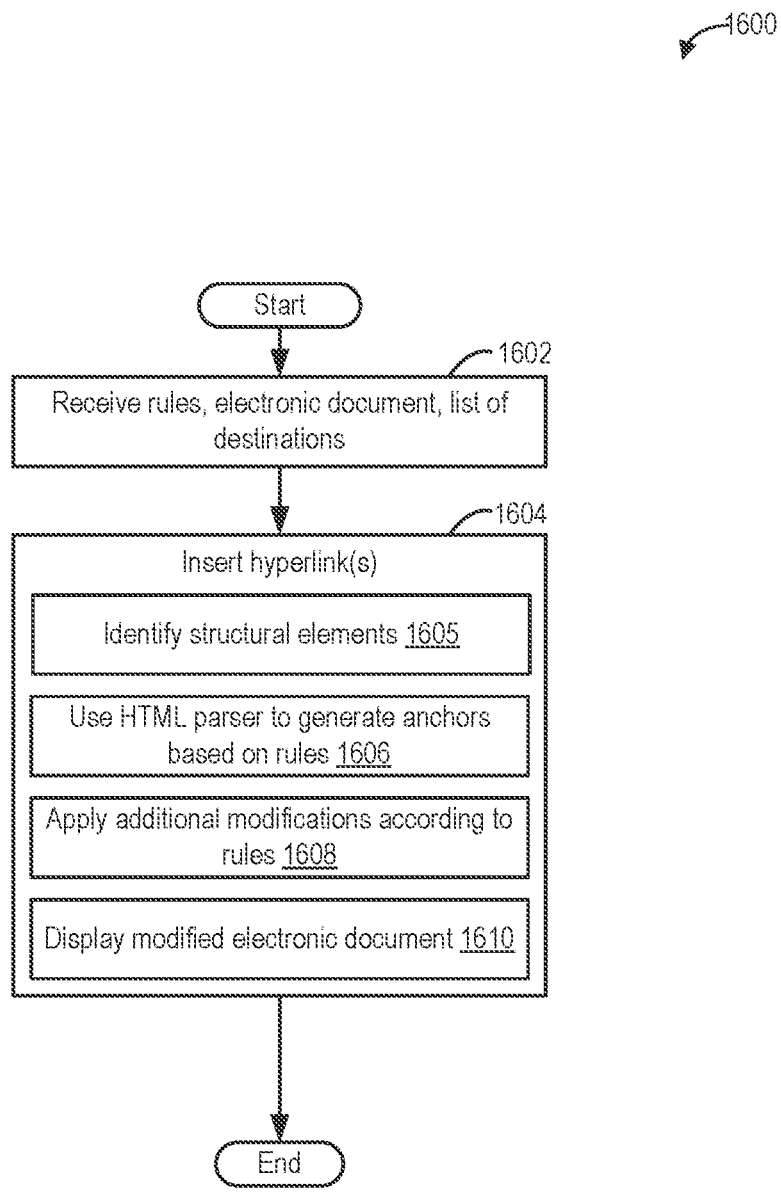
FIG. 16 shows an example of a method for automatically inserting hyperlinks into a document.

The following description relates to various embodiments of a dynamic hyperlink generation system. The dynamic hyperlink generation system may be configured with a hyperlink generation engine, as shown in FIG. 1, which may automatically insert hyperlinks into a document, e.g., a webpage. The dynamic hyperlink generation system may be included in a networked computing system, as shown in FIG. 2, and may insert hyperlinks into various structural elements of the webpage where a presentation of the hyperlinks may vary according to a type of structural element and/or a pattern. Examples of how the hyperlinks may be presented according to the type of structural element/pattern are depicted in FIGS. 3-15. An example of a method for automatically inserting hyperlinks into the webpage according to a set of rules providing structure-specific instructions for displaying the hyperlinks is shown in FIG. 16.

It should be appreciated that although text hyperlinks are described herein, the systems and methods may be implemented for non-text anchored hyperlinks, such as hyperlinks configured as images, icons, HTML elements, etc. Anchors of the hyperlinks may be linked to different types of destinations, including webpages, both internal and external to a hyperlinked website, electronic documents, images, etc. The destinations may include a variety of mixed file types including document file types, image file types, video file types, music file types, PDFs, PNGs, JPGs, TXTs, spreadsheet file types, and the like.

Turning now to FIG. 1, a dynamic hyperlink generation system 100 is depicted as a block diagram therein. The dynamic hyperlink generation system (hereafter, system) 100 may automatically generate and insert hyperlinks into electronic text files in real-time according to user-defined rules with respect to content structure in the electronic text files, as described further below. The hyperlinks may associate digital content of various types to the electronic text files.

The system 100 may include a server, e.g., a web server, 102, a hyperlink generation engine 104, and a content database 106. The hyperlink generation engine 104 may draw linked content from the content database 106. The server 102 may be connected to a client system 108 by a network 110 (e.g., the Internet). It will be appreciated that while only one of each of the server 102, client system 108, network 110, etc., are shown, other examples may include more than one of each element of the system 100. Furthermore, alternate types of each element are possible. For example, the server 102 may be configured to host Internet activity or may be a server within a networked environment.

The server 102 may host data content, such as webpages with electronic text files. The electronic text files may be various types of text-based, computer readable files, including electronic documents, emails, new and other content-related articles, blog postings, etc. Each of the electronic text files may be formed of a Hyper-Text Markup Language (HTML) file, an Extensible Hyper-Text Markup Language (XHTML) file, or some other similar type of file. In one example, the electronic text files may be HTML files that are hosted and displayed on a website at the client system 108 by way of the server 102 and the network 110.

The electronic text files may be stored in the content database 106 to be retrievable upon demand when hyperlink creation is initiated. As an example, the server may retrieve an electronic text file 112 from the content database 106 and deliver the electronic text file 112 to the hyperlink generation engine 104. The hyperlink generation engine 104 may analyze and process the electronic text file 112 as described below, with reference to FIGS. 3-9, to insert hyperlinks at target locations within the electronic text file 112. Each of the hyperlinks may be a bridge between a point in the electronic text file 112 in which the hyperlinks are embedded, e.g., an anchor of a hyperlink, and a source of related information in a different location from the anchor, e.g., a destination of the hyperlink.

Hyperlinks may use an href attribute to specify a URL that the hyperlink links to. However, in other examples, other protocols besides HTTP-based URLs may be used that adhere to URL schemes supported by web browsers. Other hyperlink attributes may include a target, e.g., where to display the linked URL in a webpage, and a Download attribute which prompts a user to save the linked URL to a computer instead of navigating to the URL. When adding hyperlinks to the electronic text file 112 from the content database 106, the hyperlink generation engine 104 may modify the electronic text file 112 by adding hyperlinks where indicated and/or targeted. A resulting, modified version of the electronic text tile may be stored separately from the original file. The electronic text file 112 may be written and parsed in a variety of formats including plain text, Markdown, etc., and may eventually be converted into HTML by the server 102 before returning to the user.

The destination may be in a different section of the same electronic text file as the anchor, in a different electronic text file included in a same website formed of one or more electronic text files, or in a different website. The anchor of the hyperlink may be a visually distinct character, word, phrase, sentence, image, emoji, symbol, etc., in a webpage displayed to the user that allows the user to readily access additional information germane to a topic indicated by the anchor. Herein, the hyperlink may provide a link between a mutable anchor and a destination that is selected based on the anchor. For example, the anchor may be altered in real-time to accommodate an indicated topic of interest of the user which may be determined by monitoring the user's behavior as the user interacts with the webpage. The destination of the hyperlink may be similarly adjusted in real-time according to changes in the anchor, thereby increasing a likelihood that the user is able to rapidly obtain useful information.

The target locations of the electronic text file 112 may be used to query a webpage database index 114 to identify and locate websites that are relevant to the target locations. The webpage database index 114 may include indexed internal webpages, e.g., webpages included in a same website at which the electronic text file 112 is displayed, and/or external webpages, e.g., webpages included in a different website from the website at which the electronic text file 112 is displayed, or indexed versions of other types of electronic documents. The indexed webpages of the webpage database index 114 may be webpages identified with meta data related to the target locations of the electronic text file 112 and the hyperlink generation engine 104 may query the webpage database index 114 to locate webpages with metadata identifiers that correspond to the target locations.

Upon identifying the related webpages, the hyperlink generation engine 104 may dynamically generate a hyperlink at each of the target locations of the electronic text file 112, thereby linking the electronic text file 112 to an associated webpage at each hyperlink. In one example, the webpage database index 114 includes indexed versions of webpages that mirror the webpages stored in webpage database 116, the webpage database may be stored at the server 102. As webpages are added or removed from the webpage database 116, the webpage database index 114 may be updated accordingly via communication link 120. The hyperlink generation engine 104 is able to access addresses and locations of the webpages stored in webpage database 116 through communication link 120. The electronic text file 112 is transformed into a hyperlinked electronic text file 118 by the hyperlink generation engine 104 and made accessible to the client system 108 by returning the hyperlinked electronic text file 118 to the server 102. In some examples, the hyperlinked electronic text file 118 may be stored at the content database 106

Details of the server 102 and the client system 108 are depicted in FIG. 2. FIG. 2 is a block diagram illustrating an example networked computing system 200, according to an embodiment. The networked computing system 200 includes the server 102 and the client system 108, communicatively coupled to the server 102 via the network 110. It should be appreciated that variations in the arrangement and type of components of the networked computing system 200 may be made without departing from the scope of the present disclosure. For example, the networked computing system 200 may include more than one client system 108 communicatively coupled to the server 102 via the network 110.

The server 102 includes a computing system configured to serve webpages upon request to one or more client systems such as the client system 108. Although the server 102 is depicted in FIG. 1 as a single device, in some embodiments the networked computing system 200 may include a plurality of servers 102 configured for distributed computing. In different embodiments, the server 102 may take the form of a mainframe computer, a server computer, a desktop computer, a laptop computer, a tablet computer, a network computing device, a mobile computing device, a microprocessor, and so on.

Server 102 includes a logic subsystem 202 and a data-holding subsystem 204. Logic subsystem 202 may include one or more physical devices configured to execute one or more instructions. For example, logic subsystem 202 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 202 may include one or more processors that are configured to execute software instructions. Additionally or alternatively, the logic subsystem 202 may include one or more hardware or firmware logic machines configured to execute hardware or firmware instructions. Processors of the logic subsystem 202 may be single core or multi-core, and the programs executed thereon may be configured for parallel or distributed processing. The logic subsystem 202 may optionally include individual components that are distributed throughout two or more devices, which may be remotely located and/or configured for coordinated processing. One or more aspects of the logic subsystem 202 may be virtualized and executed by remotely accessible networked computing devices configured in a cloud computing configuration.

Data-holding subsystem 204 may include one or more physical devices configured to hold data and/or instructions executable by the logic subsystem 202 to implement the herein described methods and processes. When such methods and processes are implemented, the state of data-holding subsystem 204 may be transformed (for example, to hold different data).

As described above, the server 102 may be a web server for automatically generating hyperlinks in a document such as a webpage. In particular, as described further herein, the hyperlink generation engine 104 may evaluate code relating to electronic files metadata uploaded to the data-holding subsystem 204, generate one or more databases 206, including the webpage database index 114 and the webpage database 116 of FIG. 1, based on the evaluated code, and automatically generate a hyperlink without further user input. Although the one or more databases 206 are depicted as stored in the data-holding subsystem 204 of the server 102, it should be appreciated that in some examples, the one or more databases 206 may be stored in a separate computing system communicatively coupled to the server 102 and accessible via the network 110.

The server 102 may further include a display subsystem 208 and a communication subsystem 210. When included, display subsystem 208 may be used to present a visual representation of data held by data-holding subsystem 204. As the herein described methods and processes change the data held by the data-holding subsystem 204, and thus transform the state of the data-holding subsystem 204, the state of display subsystem 208 may likewise be transformed to visually represent changes in the underlying data. Display subsystem 208 may include one or more display devices utilizing virtually any type of technology. Such display devices may be combined with logic subsystem 202 and/or data-holding subsystem 204 in a shared enclosure, or such display devices may be peripheral display devices.

When included, communication subsystem 210 may be configured to communicatively couple the server 102 with one or more other computing devices, such as client system 108. Communication subsystem 210 may include wired and/or wireless communication devices compatible with one or more different communication protocols. As non-limiting examples, communication subsystem 210 may be configured for communication via a wireless telephone network, a wireless local area network, a wired local area network, a wireless wide area network, a wired wide area network, etc. In some embodiments, communication subsystem 210 may allow the server 102 to send and/or receive messages to and/or from other devices via the public Internet. For example, communication subsystem 210 may communicatively couple the server 102 with client system 108 via the network 110. In some examples, the network 110 may be the public Internet. In other examples, the network 110 may be regarded as a private network connection and may include, for example, a virtual private network or an encryption or other security mechanism employed over the public Internet.

Further, the server 102 provides a network service that is accessible to a plurality of users through a plurality of client systems such as the client system 108 communicatively coupled to the server 102 via the network 110. As such, the networked computing system 200 may include one or more devices operated by users, such as client system 108. Client system 108 may be any computing device configured to access a network such as network 110, including but not limited to a personal desktop computer, a laptop, a smartphone, a tablet, and the like. While one client system 108 is shown, it should be appreciated that any number of user devices or client systems may be communicatively coupled to the server 102 via the network 110.

Client system 108 includes a logic subsystem 212 and a data-holding subsystem 214. Client system 108 may optionally include a display subsystem 216, communication subsystem 218, a user interface subsystem 220, and/or other components not shown in FIG. 2.

Logic subsystem 212 may include one or more physical devices configured to execute one or more instructions. For example, logic subsystem 212 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 212 may include one or more processors that are configured to execute software instructions. Additionally or alternatively, the logic subsystem 212 may include one or more hardware or firmware logic machines configured to execute hardware or firmware instructions. Processors of the logic subsystem 212 may be single or multi-core, and the programs executed thereon may be configured for parallel or distributed processing. The logic subsystem 212 may optionally include individual components that are distributed throughout two or more devices, which may be remotely located and/or configured for coordinated processing. One or more aspects of the logic subsystem 212 may be virtualized and executed by remotely accessible networking computing devices configured in a cloud computing configuration.

Data-holding subsystem 214 may include one or more physical, non-transitory devices configured to hold data and/or instructions executable by the logic subsystem 212 to implement the herein described methods and processes. When such methods and processes are implemented, the state of data-holding subsystem 214 may be transformed (for example, to hold different data).

Data-holding subsystem 214 may include removable media and/or built-in devices. Data-holding subsystem 214 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 214 may include devices with one or more of the following characteristics: volatile, nonvolatile, dynamic, static, read/write, read-only, random access, sequential access, location addressable, file addressable, and content addressable. In some embodiments, logic subsystem 212 and data-holding subsystem 214 may be integrated into one or more common devices, such as an application-specific integrated circuit or a system on a chip.

When included, display subsystem 216 may be used to present a visual representation of data held by data-holding subsystem 214. As the herein described methods and processes change the data held by the data-holding subsystem 214 and thus transform the state of the data-holding subsystem 214, the state of display subsystem 216 may likewise be transformed to visually represent changes in the underlying data. Display subsystem 216 may include one or more display devices utilizing virtually any type of technology. Such display devices may be combined with logic subsystem 212 and/or data-holding subsystem 214 in a shared enclosure, or such display devices may be peripheral display devices.

In one example, the client system 108 may include executable instructions 222 in the data-holding subsystem 214 that when executed by the logic subsystem 212 cause the logic subsystem 212 to perform various actions as described further herein. As one example, the client system 108 may be configured, via the instructions 222, to receive a webpage including one or more hyperlinks transmitted by the server 102, and display the hyperlinked webpage via a graphical user interface on the display subsystem 216 to a user.

When included, communication subsystem 218 may be configured to communicatively couple client system 108 with one or more other computing devices, such as the server 102. Communication subsystem 218 may include wired and/or wireless communication devices compatible with one or more different communication protocols. As non-limiting examples, communication subsystem 218 may be configured for communication via a wireless telephone network, a wireless local area network, a wired local area network, a wireless wide area network, a wired wide area network, etc. In some embodiments, communication subsystem 218 may allow the client system 108 to send and/or receive messages to and/or from other devices, such as the server 102, via the network 110.

The client system 108 may further include the user interface subsystem 220 including user input devices such as keyboards, mice, game controllers, cameras, microphones, and/or touch screens. A user of client system 108 may input a request to load or otherwise interact with the hyperlink of the webpage stored by the server 102, for example, via user interface subsystem 220.

Thus the server 102 and the client system 108 each represent computing devices which may generally include any device that is configured to perform computation and that is capable of sending and receiving data communications by way of one or more wired and/or wireless communication interfaces. Such devices may be configured to communicate using any of a variety of network protocols. For example, the client system 108 may be configured to execute a browser application stored as the instructions 222 that employs HTTP to request information from the server 102 and then displays the retrieved information to a user on a display such as the display subsystem 216.

The hyperlink generation engine, e.g., the hyperlink generation engine 104 of FIGS. 1 and 2, may allow hyperlinks of a webpage to be automatically inserted. In contrast to conventional methods for automatically inserting hyperlinks into the webpage, the hyperlink generation engine 104 may add hyperlinks based on types of structural elements available at the webpage. In other words, placement of the hyperlinks may be determined based on page structure. Furthermore, a placement and presentation of the hyperlinks may be selected according to a user-defined set of rules that provides more discriminating and suitable placement of the hyperlinks compared to inserting the hyperlinks based on, for example, keywords. By adding hyperlinks according to page structure, a user experience may be enhanced when navigating the webpage and the user may obtain desired information more efficiently. In addition, the hyperlinks may be positioned in more aesthetically appealing and meaningful locations in the webpage, thereby increasing a likelihood that the user interacts with the hyperlinks.

As an example, in a conventional system for generating hyperlinks, a keyword in the electronic text file may be identified to be hyperlinked, resulting in creation of a hyperlink with each iteration of the keyword in the webpage. In some instances, the keyword may be repeated numerous times within a section of the webpage. For example, the keyword may appear at least once in each sentence of each paragraph of the webpage. As a result, an abundance of hyperlinks in the section may cause the text to appear cluttered which may be off-putting to the user. As well, conventional methods for hyperlink generation may not include capabilities for identifying a keyword to be hyperlinked within another keyword, adapting to keywords with dashes, apostrophes, plural forms or inflections of the keyword, and/or adapting to overlapped matching of keywords.

In one example, as described herein, a hyperlink generation engine may select hyperlink placement based on specific formatting, e.g., patterns, and structural elements displayed at a webpage. For example, the hyperlink generation may identify, via text and/or document processing algorithms, structural elements such as different types of lists (bulleted, numbered, etc.), headings, tables, paragraphs of text, coordinates on an image, etc., and refer to a set of rules for hyperlink placement where the set of rules may be defined by a user. The patterns may include an occurrence or frequency of a target anchor (e.g., a keyword) for hyperlink placement, a distance between hyperlinks, a maximum allowable number of hyperlinks at the webpage, a percentage of a structural element to be hyperlinked, etc. The positioning of a hyperlink within the structural elements may be determined based on the set of rules. As an example, placement of the hyperlink before or after a bullet in a bulleted list may be determined by the set of rules. Further details of hyperlink insertion via the hyperlink generation engine are provided below, with reference to FIGS. 3-7.

Turning now to FIG. 3, a first example of a structural element for hyperlink insertion is illustrated within a paragraph 300 of text. The paragraph 300 includes a plurality of hyperlinks located at various words or terms of the paragraph. As such each term at which one of the plurality of hyperlinks is placed is referred to as an anchor of a hyperlink. Each anchor depicted in the paragraph 300 may correspond to a specific term or phrase that provides useful information relative to a topic of the paragraph.

For example, the paragraph 300 is directed to defining "Scoring Rules" in football and each anchor is a term of phrase that further defines "Scoring Rules" and/or has a meaningful connection to "Scoring Rules". Each anchor may motivate further interest and may therefore be hyperlinked such that a user, e.g., a user perusing the webpage for information, may navigate to another webpage or electronic document that provides information regarding a topic introduced by the anchor. It will be appreciated that a destination coupled to the anchor, e.g., as provided by a hyperlink, may be presented in various ways other than direct navigation to a different webpage or electronic document. Other examples may include, for example, scrolling of the webpage to a different section of the webpage that provides information with respect to the anchor. As another example, display of a pop-up at the current webpage may be activated when the user interacts with the anchor, where the pop-up may present a definition of the anchor, a list of destinations related to the anchor, etc.

In one example, the anchors may be selected from the text displayed at the webpage by the hyperlink generation engine based on a predetermined set of keywords and key phrases defined by a user (e.g., a user providing rules for the hyperlink generation engine). In another example, the predetermined set of keywords may be defined using machine learning (ML) and/or artificial intelligence (AI). For example, structural elements of the webpage/website or of related webpages/websites, as well as keywords, phrases, and destinations, may be automatically identified based on webpage titles of a website and used to generate a text-to-destination map.

The text-to-destination map may be used as a tool for building a record of which elements, e.g., target locations, of the webpage are hyperlinked and what the hyperlinks connect the webpage to. Furthermore, the text-to-destination map may store relationships and associations between one or more linkable texts and one or more destinations where the hyperlinks are generated based on the stored relationships and associations.

The text-to-destination map may enable the hyperlink generation engine to automatically identify linkable text in each webpage of the website, such as nouns, entities, names, phrases, and images, which may be used as hyperlink anchors, and their associated destinations. A record may be created which may be accessed by the hyperlink generation engine for future hyperlink generation. The tool may generate maps of the anchors and destinations which may be queried in real-time when the user is interacting with the webpages, thereby assisting in meaningful and useful dynamic hyperlink placement. The text-to-destination map may be recorded, for example, at a database accessible to the hyperlink generation engine.

The predetermined set of keywords, either provided by the user or generated via ML/AI, may be stored at a set of rules for the hyperlink generation engine and the hyperlink generation engine may refer to the set of keywords for each webpage where hyperlink insertion is requested. Webpages may be grouped or tagged which may be matched to a reference set of predetermined keywords with corresponding tags. Alternatively, keywords may be set on a page by page basis. The keywords may be global keywords configured to "or link everywhere" regardless of context, or context-based keywords configured to "link only within a topic". As a keyword may have a different meaning according to topic, a more relevant list of keywords (according to the topic) for hyperlinking may be determined by the user or AI/ML. Keywords may also have higher weights or ranking based on importance and relevancy. For example, a name of an entity may have a higher weight or ranking than an adjective.

As an example, the text-to-destination map may be generated by user input or by AI/ML where the webpages and metadata of the website is read in. The keywords and/or key phrases may be identified in text corpus based on matches between the text corpus and a database of keywords/key phrases. Hyperlinks may be created at the matches, linking destinations from the text-to-destination map to the keywords/key phrases.

Without the set of rules, automatic hyperlink generation using only the database of keywords/key phrases may impose a large burden on processing power and be prone to errors. For example, as shown in FIG. 4, the hyperlink generation engine may be unable to determine suitable hyperlink placement based on surrounding text or a context of an identified keyword. For example, at a second bullet point of a paragraph 400 shown in FIG. 4, the hyperlink generation engine may locate a match between "point" and a keyword database and generate a hyperlink 402 thereat. However, in the paragraph 400, a more relevant anchor may be "two-point conversion" rather than "point" alone, based on a topic of the paragraph 400. As such, the hyperlink set at "point" may be anchored to a destination with low relevancy and little interest to the user.

As shown in FIG. 5A in another example, the set of rules may provide instructions for hyperlink placement at terms that are linked in meaning to form a phrase. A conventional system for automatic hyperlinking text in a webpage, e.g., based solely on identification of keywords, may include selecting an anchor 500 to hyperlink without accounting for a suitable context of the anchor 500. While a third sentence of a paragraph of text 502 may provide a description of a running back, the conventional system may not be configured to recognize a relationship between a first portion of the phrase, e.g., "running" and a second portion of the phrase, e.g., "back". As a result, only the first portion is used as the anchor 500 and may be linked to a destination relevant to "running" rather than to "running back".

In contrast, as shown in FIG. 5B, the hyperlink generation engine may be configured with the set of rules to enable evaluation of a more suitable anchor 550 for a hyperlink based on a topic of the paragraph of text 502 of FIG. 5A. In some instances, a heading of the paragraph of text 502 (e.g., "Football Touchdowns"), or the webpage title may be used to identify the topic. As such the full phrase "running backs" may be determined to be more relevant than "running" alone, and may be used as the anchor 550. A destination for the hyperlink may provide additional information regarding running backs. The hyperlink generation engine may be configured to use a longer anchor text first when comparing more than one possible anchors due to a higher relevancy associated with longer anchor text. As a result, hyperlinking "Running backs" rather than "Running" may provide a link to a more relevant destination according to football touchdowns.

By implementing the set of rules to guide the hyperlink generation engine, a hyperlink may be generated only after both matching with a keyword/key phrase from the database and satisfying the set of rules. By satisfying the set of rules, keywords/key phrases may be automatically linked to relevant destinations while accounting for a structure, user-defined rules, and patterns, such as a distance between hyperlinks or a portion of a structural element of the webpage.

The set of rules providing instructions to the hyperlink generation engine may include rules regarding how often a term or phrase displayed as an anchor may be subsequently displayed as the anchor. For example, the set of rules may include hyperlinking a term or phrase at a first occurrence of the term/phrase and not hyperlinking subsequent occurrences of the term/phrase. Returning to FIG. 3, a first hyperlink 302 of the plurality of hyperlinks is shown at a first anchor of "scoring". Other appearances of various versions of "scoring", such as "score", "scores", etc., are not hyperlinked. Thus different inflections of the term or phrase used as a hyperlink anchor may be recognized by the hyperlink generation engine to be related to the hyperlinked version of the term of phrase. Similarly, a second hyperlink 304 of the plurality of hyperlinks linked to a second anchor of "end zone", is used in the paragraph 300 more than once but only a first instance of "end zone" is hyperlinked. In other examples, however, more than one occurrence of the keyword/key phrase may be hyperlinked. For example, the set of rules may include hyperlinking a first and a second occurrence of the keyword within a section of the webpage. Additionally, a pattern based on occurrence may also be set, such as instructions to hyperlink "every other", "every third", "every fourth" time the keyword appears in the text. The hyperlink generation engine may monitor a count of every keyword hyperlinked.

In other examples, a term/phrase selected to be an anchor may be hyperlinked at other desired intervals at the webpage. For example, the term/phrase may be configured as an anchor at a first occurrence of the term/phrase of each paragraph of the webpage or a first occurrence of the term/phrase in different structural elements of the webpage. As one example, the term/phrase may be hyperlinked at a first appearance of the term/phrase in a paragraph, in a list, and in a table. As another example, a frequency of the term/phrase configured as the anchor may be weighted relative to how often the term/phrase is included in the webpage.

Patterns within the structural element may also be used to evaluate suitable placement of hyperlinks. As described above, the patterns may include an occurrence or frequency of a term. For example, as shown in FIG. 6A, in a section of text 600, including a first paragraph 602 and a second paragraph 604, a term "touchdown" appears repeatedly throughout the section of text 600. The hyperlink generation engine may detect a frequency that the term appears and designate the term as a keyword to be hyperlinked. However, selection of anchors within the of text 600 may be determined based on the set of rules to provide a visually appealing placement of the anchors.

For example, a conventional system for automatically generating hyperlinks may assign each occurrence of the term "touchdown" as an anchor, as illustrated in FIG. 6A. Such frequency of hyperlink placement using the same term as the anchor may be deemed overly repetitive by the user.

When the hyperlink generation engine is used instead, however, the set of rules may define how the hyperlink generation engine addresses repetition of the term selected to be an anchor. As an example, and shown in FIG. 6B, the set of rules may provide instructions to use only a first occurrence of the term in each of the first paragraph 602 and the second paragraph 604 to be hyperlinked. In other words, a section reset may be identified by the hyperlink generation engine where the section reset is recognized when a new paragraph or a new heading is encountered. The user may therefore locate the hyperlink readily without scrolling back and forth while the appearance of the section of text 600 remains uncluttered. This pattern may also be referred to as "every other" or as "hyperlink every other occurrence" within a document.

Figure 7:
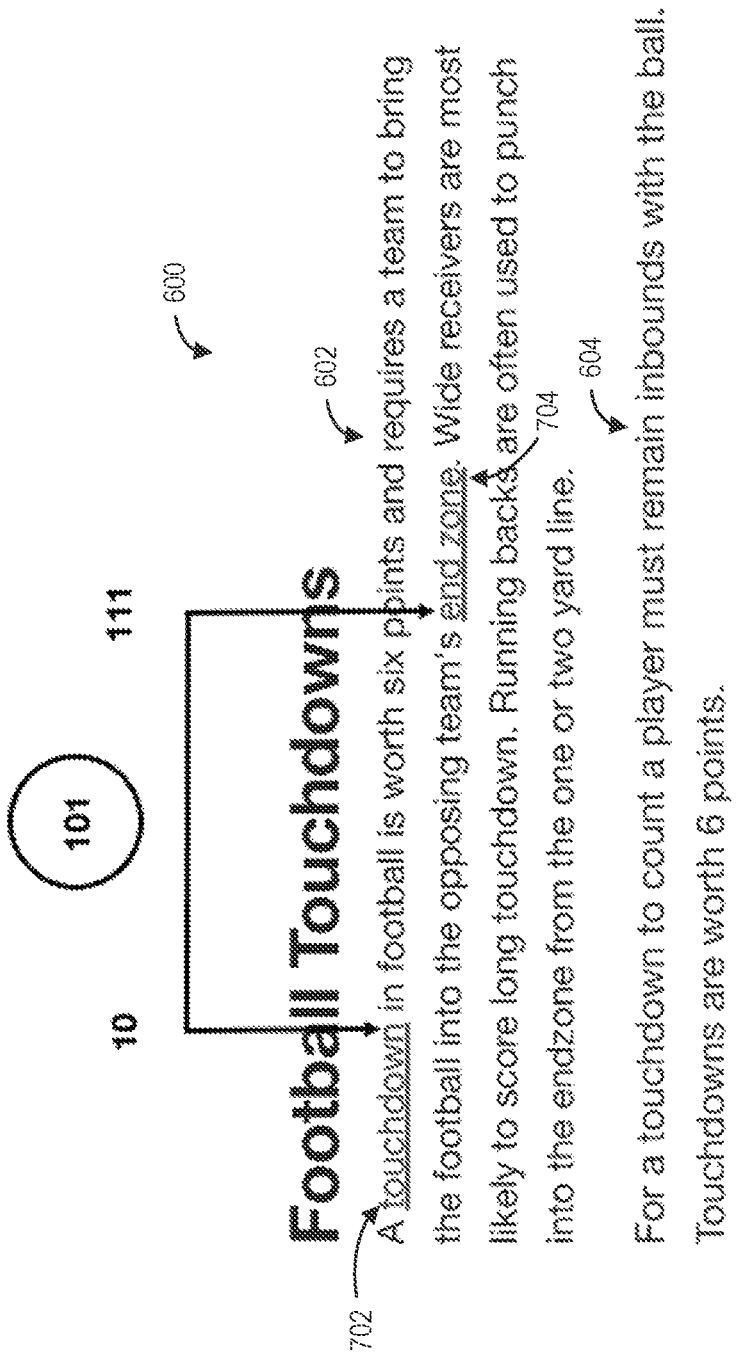
FIG. 7 shows a second example of a pattern in which hyperlinks may be automatically inserted.

The patterns used to determine hyperlink placement within the structural elements of the webpage may also include a character distance between terms/phrases identified as anchors for hyperlink placement. Turning now to FIG. 7, the section of text 600 of FIGS. 6A-6B is shown with annotations indicated by numbers and arrows which are presented for illustrative purposes and not actually displayed in the webpage. The first paragraph 602 of the section of text 600 includes a first anchor 702 (e.g., "touchdown") for a first hyperlink and a second anchor 704 (e.g., "end zone") for a second hyperlink. As indicated by arrows in FIG. 7 and numbers positioned above the section of text 600, the first anchor 702 ends at a position of 10 characters (including spaces) after a first character (e.g., "A") of the first paragraph 602. The second anchor 704 begins at a position of 110 characters after the first character of the first paragraph 602. The end of the first anchor 702 is therefore spaced away from the beginning of the second anchor 704 by 101 characters which may be a distance greater or less than a threshold distance included in the set of rules. The threshold distance is not applied to hyperlink placement determination in FIG. 7. It will be noted that the arrows and numbers positioned above the sections of text in FIGS. 8A and 9A, in addition to FIG. 7 are similarly for illustrative purposes and do not actually appear in the webpages.

Figure 8A:
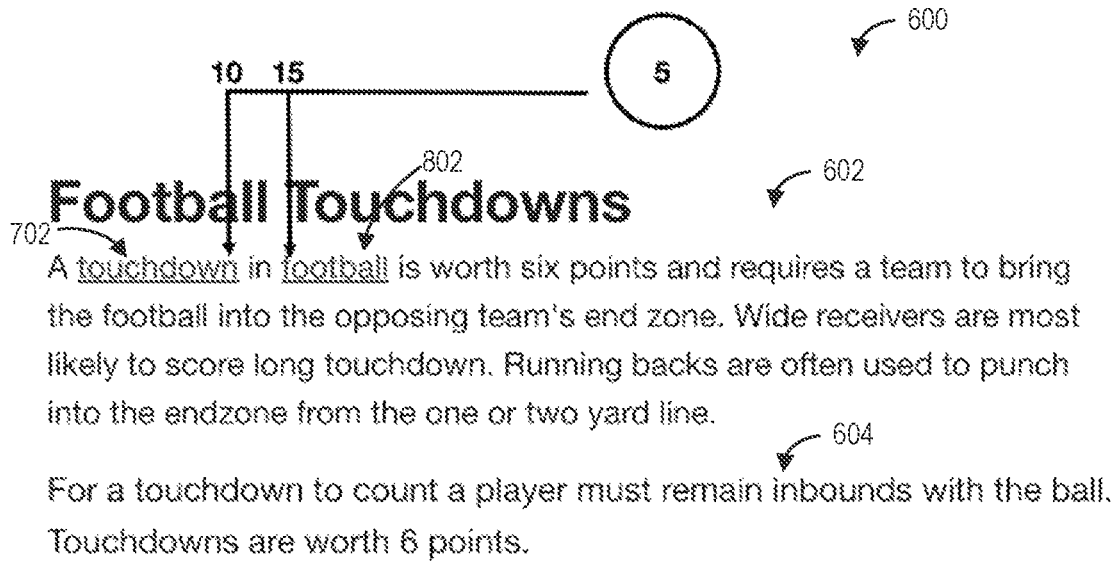
FIG. 8A shows an example of less accurate placement of hyperlinks based on the pattern of FIG. 7.
Figure 8B:
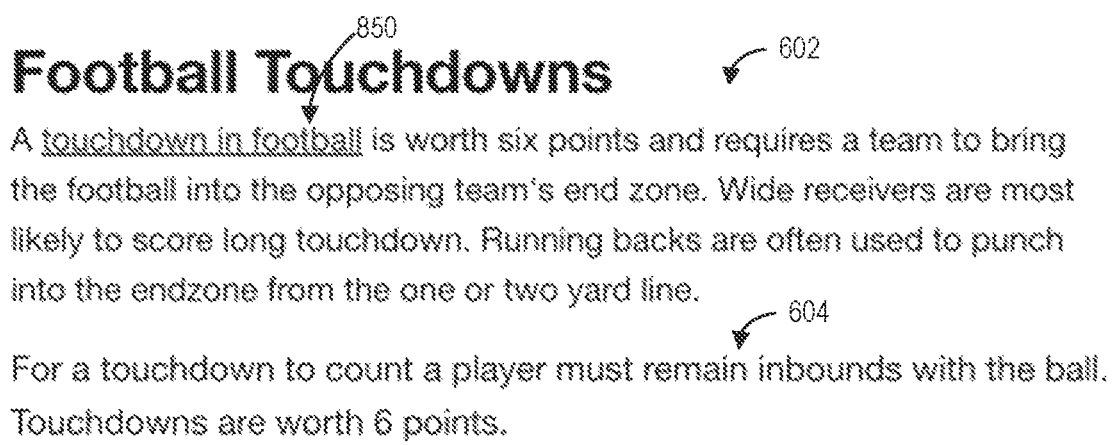
FIG. 8B shows an example of more accurate placement of hyperlinks relative to FIG. 8A.

In contrast, as shown in FIG. 8A, the first anchor 702 is spaced away from a third anchor 802 by 5 characters, as indicated by arrows and numbers positioned above the section of text 600. A distance between the first anchor 702 and the third anchor 802 may be less than the threshold distance, where the threshold distance may be a distance of 5 or fewer characters. The hyperlink generation engine may be configured, based on the set of rules, to combine the first anchor 702 and the third anchor 802 into a single, fourth anchor 850 for a hyperlink, as shown in FIG. 8B.

Figure 9B:
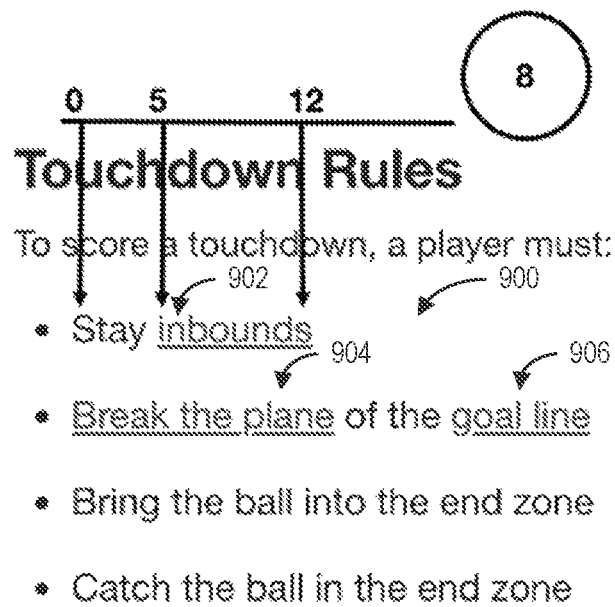
FIG. 9B shows an example of more suitable placement of hyperlinks according to a use-case scenario, relative to FIG. 9A.

The use of the threshold distance for determining whether to separate or combine anchors may also be applied to other structural elements such as bulleted lists. Furthermore, the set of rules may also include instructions to combine neighboring hyperlinks based on a percentage of a structural element that is formed by a hyperlink. For example, a bulleted list 900 is shown in FIGS. 9A-9B. A first bulleted item of the bulleted list 900 includes a first anchor 902 and a second bulleted item of the bulleted list 900 includes both a second anchor 904 and a third anchor 906.

At the first bulleted item, a percentage of text at the first bulleted item forming the first anchor 902 may be used to adjust the first anchor 902. For example, the first anchor 902 of "inbounds" includes 8 characters out of a total of 13 characters included in "stay "inbounds", thereby incorporating 62% of the first bulleted item. The hyperlink generation engine may be configured to compare the percent portion of the first bulleted item formed by the first anchor 902 and compare the percent portion to a threshold percent. For example, the threshold percent may be 50%, 60%, or some other percentage. If the percent portion of the first anchor 902 is greater than the threshold percent, the first anchor 902 may be extended to include "stay", as shown in FIG. 9B. As a result, the first anchor 902 may be adjusted to a more salient phrase relative to a topic of the webpage section.

At the second bulleted item of FIG. 9A, the second bulleted item located below the first bulleted item, it may be determined that a character distance between the second anchor 904 and the third anchor 906 may be less than the threshold distance, e.g., as described above. Combining of the second anchor 904 and the third anchor 906 into a single anchor may be indicated but selection of a suitable destination is demanded. For example, the single, combined anchor may be linked to a destination of the second anchor 904 or to a destination of the third anchor 906. Modification of the anchors may be executed based on which of the anchors constitutes a greater percentage of text of the second bulleted item. For example, "break the plane" occupies a larger percentage of the second bulleted item text than "goal line". Thus, the second anchor 904 may be weighted more heavily or ranked higher than the third anchor 906 and the second anchor 904 may be extended to envelope the third anchor 906, as shown in FIG. 9B. The destination of the second anchor 904 in FIG. 9B may correspond to "break the plane" rather than "goal line".

Figure 10:
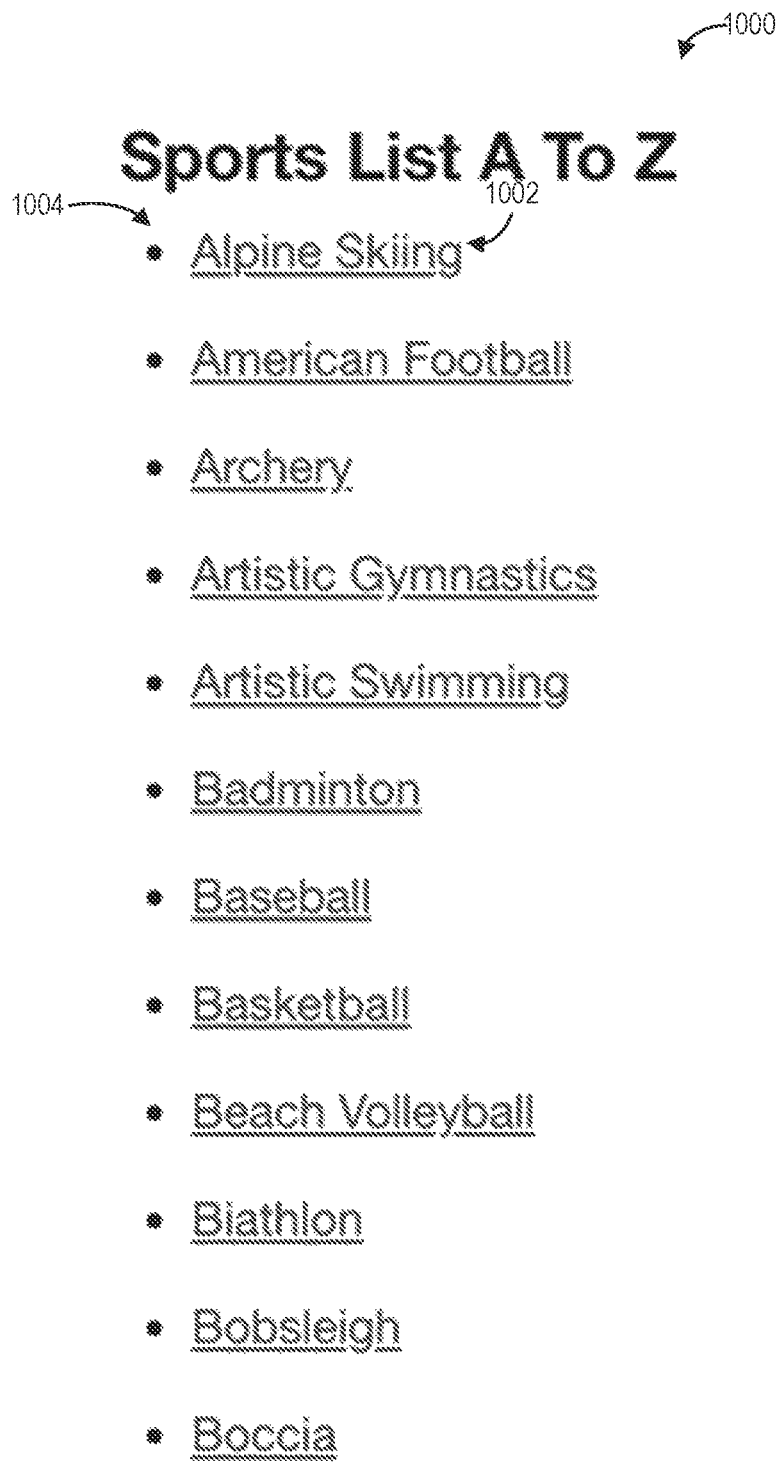
FIG. 10 shows an example of a structural element into which hyperlinks may be automatically placed, where the structural element is a bulleted list.

Another example of a bulleted list 1000 is illustrated in FIG. 10. The bulleted list 1000 includes a catalog of sports presented in alphabetical order. Each listed item 1002 of the bulleted list 1000 is indicated by a bullet 1004, e.g., depicted as a dot, preceding a name of a type of sport. Hyperlinks may be inserted into the bulleted list 1000 by the hyperlink generation engine based on identification of the bullet 1004 positioned in front of the listed item 1002 as well as distinguishing the bullet 1004 from text of the listed item 1002 following the bullet 1004.

For the bulleted list 1000 of FIG. 10, the set of rules for inserting hyperlinks into a list may include instructions for defining the list, e.g., detection of a series of bullets aligned along a vertical axis of the webpage, and inserting hyperlinks at text displayed after each of the bullets (e.g., horizontally) in response to detection of the series of bullets. As a result, bulleted lists may be automatically hyperlinked in an efficient and aesthetically appealing manner.

Figure 11:
FIG. 11 shows an example of a structural element into which hyperlinks may be automatically placed, where the structural element is a numbered list.

In instances where a list is numbered rather than bulleted, the hyperlink generation engine may similarly insert hyperlinks automatically based on the set of rules. For example, the set of rules may include instructions to either hyperlink a full text of each item of a bulleted or numbered list or to not hyperlink any of the text. As another example, the set of rules may include only generating a single hyperlink at each item. As shown in FIG. 11, another example of a structural element of the webpage into which a hyperlink may be automatically inserted is depicted as a numbered list 1100. The set of rules may further include instructions for identifying a series of numbers, each number followed by a term or phrase, arranged along the vertical axis of the webpage, in one example. The hyperlink generation module may be commanded to insert hyperlinks into the entire term/phrase of each numbered item, following the number and not including the number.

Yet another example of a structural element of a webpage for automatic hyperlink insertion is shown in FIG. 12 as a heading 1200 for a paragraph 1202. The hyperlink generation engine may be configured to identify the heading 1200 to be distinct from the paragraph 1202 based on, for example, a font size and/or a typeface of the heading 1200, a font style of the heading 1200, a position of the heading 1200 relative to the paragraph 1202, etc., as defined by the set of rules. The set of rules may further provide instructions on how much of the heading 1200, e.g., a percentage of characters of the heading, is configured as an anchor. For example, the heading 1200 is presented as two terms, "Football" and "Touchdown" which may be determined to demand inclusion of both words of the heading 1200 to provide a complete name for an associated topic of interest described in the paragraph 1202. As hyperlinking only one term of the heading, e.g., only "Football" or only "Touchdown", may not accurately represent the topic of interest, both terms are hyperlinked in the heading 1200.

However, in other examples, the heading may instead be a sentence where a portion of the terms in the sentence may not be specific to the topic of interest. In such instances, only a relevant portion of the heading may be configured as the anchor. The hyperlink generation engine may make a logical determination based on, for example, a combination of rules provided for identifying the heading and rules provided for identifying keywords. Thus, a configuration of the anchor may be selected based on a fulfillment of both types of rules, e.g., keywords within a heading are set as an anchor for a hyperlink.

Turning now to FIG. 13, structural elements of the webpage for automatic hyperlink insertion may include a table 1300. While the table 1300 is illustrated with two columns, it will be appreciated that the application of automatic hyperlink insertion to tables described herein is applicable to tables of various dimensions, e.g., any number of columns and rows. A first column 1302 of the columns of the table 1300 may provide names of air sports. A second column 1304 of the table 1300 may provide a brief description of a corresponding air sports listed in the first column 1302. A placement of hyperlinks in the table 1300 may be defined by the set of rules which may instruct hyperlinking of only the first column 1302.

In another example of hyperlink placement based on patterns, punctuation may be used to determine suitable placement of hyperlinks. As an example, a bulleted list 1400 is shown in FIG. 14 where each bulleted item includes a term followed by a colon. The colon separates the term from a sentence following the colon which provides a definition of the term. The set of rules may include instructions to use the term preceding the colon as an anchor for a hyperlink and preclude insertion of hyperlinks into the sentence following the colon. As such, a positioning of the hyperlinks within the bulleted list 1400 is uniform and organized. Additionally, other types of punctuation arranged in a consistent pattern, e.g., after each first term or phrase of each bulleted item in a list, may be used to determine hyperlink placement, such as semi-colons, hyphens, commas, etc.

The set of rules for the hyperlink generation engine may also include a maximum allowable number of hyperlinks to be displayed within a portion of a webpage visible to the user, e.g., a visible screen. For example, an example of a visible screen 1500 is depicted in FIG. 15 which shows paragraphs of text 1502 where each paragraph of text has a heading 1504. A maximum allowable number of hyperlinks 1506 is displayed at the top right corner of the visible screen 1500 for illustrative purposes and is not actually shown to the user at the visible screen 1500.

As depicted in FIG. 15, in one example, the maximum allowable number of hyperlinks 1506 may be set to 8 hyperlinks. The hyperlink generation engine may be configured to assess candidate anchors for hyperlink placement based on the set of rules. For example, the hyperlink generation engine may identify locations of structural elements and patterns in the visible screen 1500, such as keywords within the paragraphs of text 1502, the headings 1504, and any other structural elements and patterns as described above. Upon identifying all candidate anchors, the hyperlink generation engine may be configured to compare a number of each type of candidate anchor to the maximum allowable number of hyperlinks 1506 to determine a most suitable type of anchor for the hyperlinks.

As an example, as shown in FIG. 15, the visible screen 1500 includes three of the headings 1504 and more than three keywords in the paragraphs of text 1502. The set of rules may include instructions to meet the maximum allowable number of hyperlinks 1506 by hyperlinking the structural element with the most candidate anchors, thereby maintaining a consistency of the type of structural element that is hyperlinked in the visible screen 1500. Only one type of structural element or pattern may be configured as hyperlinks. However, in other examples, the set of rule may provide instructions to prioritize hyperlinking of the headings 1504 instead and the remaining five hyperlinks of the maximum allowable number of hyperlinks 1506 may be presented at a different structural element or pattern, such as at keywords in the paragraphs of text 1502

In yet other examples, the set of rules may include instructions to refrain from hyperlinking the same keyword more than once if the maximum allowable number is set, to only hyperlink a specific destination no more than once if the maximum allowable number is set, to prioritize specific structural elements or others (e.g., a priority ordering such as headings first, then bullets, tables, and with paragraphs last), and to prioritize weighted keywords or destinations over non-weighted or lower weighted keywords/destinations.

In this way, hyperlinks may be automatically inserted into a webpage based on structural elements and formatting included in the webpage. The hyperlinks may be added to the webpage based on a set of rules that define selection of anchors corresponding to the structural elements identified in the webpage. By inserting the hyperlinks according to the structural elements rather than, for example, keywords exclusively, the hyperlinks may be located in regions of the webpage with a high likelihood of attracting a user's attention. Furthermore, structure-defined placement of the hyperlinks and consistent formatting of the hyperlinks may increase an aesthetic appeal of the webpage. Using the structural elements in an intentional manner may provide a more natural experience for the user. Furthermore, hyperlinks in a bulleted list may be more useful and attractive when the full text at each bulleted item is hyperlinked. while hyperlinks in a table may be more appealing when one column is used for hyperlinking. As well, a distance between hyperlinks in paragraphs may affect an impression of validity, e.g., suitable distancing may reduce a likelihood that the user mistakenly identifies the hyperlinks as spam links or "link blindness", which may otherwise lead to the user ignoring all links in the structural element.

An example of a method 1600 for automatically inserting hyperlinks into a webpage is depicted in FIG. 16. Method 1600 may be executed by an automated tool, such as the hyperlink generation engine 104 of FIGS. 1 and 2, based on instructions stored on a memory of a logic subsystem, such as the logic subsystem 202 of FIG. 2. The instructions, when executed, enable a processor of the logic subsystem to analyze webpages and read meta data thereof. Implementation of method 1600 may be initiated when a user creates a new webpage or modifies an existing webpage.

At 1602, method 1600 includes receiving a set of rules defining how the hyperlinks are inserted into an electronic document (e.g., an electronic file used to generate the webpage), the electronic document, and a list of destinations relevant to a subject matter of the electronic document. Information provided by the user at 1602 may be entered into a user-input page displayed at a user interface by the hyperlink generation engine. For example, the user-input page may include or be configured with a link to a sitemap for automatically creating a text-to-destination map, a manual-entered list of keywords, phrases, and destinations, defined weight and priority ranking for keywords and/or destinations, a list of patterns corresponding to keywords and phrases, a list of structural elements for hyperlinking (e.g., bullets, numbered lists, tables, etc.) and various settings associated with the structural elements, as well as a list of structural elements to not hyperlink. The user-input page may further include or be configured with a list of structural elements to always hyperlink, instructions for when patterns are to be reset (such as after each heading, for example), criteria for applying AI/ML, minimum and maximum threshold character distances between two hyperlinks, a percentage threshold of text in a structural element to be hyperlinked, a percentage threshold for extending an anchor text, and a styling of hyperlinks or specific types of hyperlinks based on the destination, anchor text, or structural element.

At 1604, method 1600 includes inserting one or more hyperlinks into the electronic document. Inserting the one or more hyperlinks may include, at 1605, analyzing and/or scanning the electronic document for structural elements present in the electronic document, using text and/or document processing algorithms. The structural elements may be identified according to structural elements defined in the set of rules and types and locations of the identified structural elements may, as an example, be stored in transient or temporary memory until hyperlink insertion is complete.

Inserting the one or more hyperlinks may also include using an HTML parser at 1606 to generate anchors of the hyperlinks into text of the electronic document at the identified structural elements. In other words, selected portions of the text of the electronic document may be converted into anchors at the structural elements. As described above, the identified structural elements may be structural elements specified to be locations for hyperlinks based on the set of rules. The HTML parser may be a software package used to access and modify HTML code of the electronic text file and/or to adjust errors and an appearance of the anchor. In other examples, however, the electronic document may include other types of text besides HTML, including plain text, Markdown, etc., and other types of parsers corresponding to the type of text may be used accordingly. The hyperlinks may be added automatically (e.g., without manual input) by altering the HTML code of the electronic document to incorporate the hyperlink and adjusting a visual appearance of the anchor at a webpage at which the electronic document is displayed.

Inserting the one or more hyperlinks may also include applying additional modifications to the hyperlinks according to the set of rules at 1608. For example, if the structural elements of the electronic document include a bulleted list, the anchors may be adjusted to only include text following a bullet, as shown in FIG. 10. As another example, anchors located in a paragraph of text may be removed if a keyword selected by the set of rules appears in the paragraph more than once. For example, as shown in FIG. 6B, any occurrences of the keyword after a first appearance in the paragraph may not be hyperlinked.

Inserting the one or more hyperlinks may further include displaying the modified electronic document at 1610. For example, the electronic document may be presented at a webpage of a website hosted at a server, which may be displayed to a user at a display device. As an example, the webpage may be publicly accessible on the Internet. Furthermore, destinations of the hyperlinks may be similarly hosted. Method 1600 ends.

The technical effect of automatically inserting hyperlinks into an electronic document based on structural elements of the electronic document is that a placement and formatting of the hyperlinks is automatically selected according to user preferences to effect a useful and organized presentation of the hyperlinks, thereby enabling information to be obtained efficiently. Placement of hyperlinks may be customized according to a hyperlink management strategy that demands relatively low processing burden while increasing an aesthetic appeal of hyperlink arrangement in a webpage display. Pre-set rules may be applied using an algorithm-based tool (e.g., a hyperlink generation engine) that analyzes an electronic document and inserts the hyperlinks within a shorter period of time than can be achieved via manual insertion (e.g., by a user). Furthermore, the tool may allow multiple rules to be simultaneously applied during hyperlink placement at the electronic document.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the systems described above with respect to FIG. 1. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure also provides support for a method for automatically inserting hyperlinks, comprising: receiving, at a processor of a server, a set of rules for inserting the hyperlinks into an electronic document based on structural elements of the electronic document, identifying structural elements present in the electronic document via an automated tool, the automated tool implemented at the processor and configured to execute insertion of the hyperlinks based on the set of rules, inserting the hyperlinks into the electronic document based on the identified structural elements, and displaying the electronic document with the hyperlinks at a display device. In a first example of the method, identifying the structural elements includes identifying one or more of a keyword, a bulleted list, a numbered list, a heading, and a table. In a second example of the method, optionally including the first example in response to identifying the keyword in the electronic document, inserting the hyperlinks includes hyperlinking a first occurrence of the keyword in a paragraph of text and not hyperlinking subsequent appearances of the keyword in the paragraph of text. In a third example of the method, optionally including one or both of the first and second examples in response to identifying the bulleted list in the electronic document, the hyperlinks are inserted into text following bullets in the bulleted list. In a fourth example of the method, optionally including one or more or each of the first through third examples, in response to identifying the numbered list in the electronic document, the hyperlinks are inserted at text representing items of the numbered list. In a fifth example of the method, optionally including one or more or each of the first through fourth examples, in response to identifying the heading in the electronic document, the hyperlinks are inserted into the heading at keywords of the heading. In a sixth example of the method, optionally including one or more or each of the first through fifth examples, in response to identifying the table in the electronic document, the hyperlinks are inserted into a column of the table. In a seventh example of the method, optionally including one or more or each of the first through sixth examples, receiving the set of rules includes receiving preferences input by a user at a user interface communicatively coupled to the processor, and wherein the preferences input by the user includes a placement and a formatting of the hyperlinks specific to a type of the identified structural elements. In a eighth example of the method, optionally including one or more or each of the first through seventh examples, receiving the set of rules includes receiving rules generating using artificial intelligence or machine learning.

The disclosure also provides support for a system for hyperlink insertion, comprising: a database storing an electronic document, a display device configured to display the electronic document, a processor, communicatively coupled to the display device and including an automated tool configured with executable instructions stored in non-transitory memory that, when executed, cause the processor to: insert hyperlinks into the electronic document at one or more structural elements identified in the electronic document according to a set of rules included in the executable instructions, the set of rules defining how the hyperlinks are displayed depending on a type of the one or more structural elements, and display the electronic document with the hyperlinks at the display device. In a first example of the system, the set of rules includes instructions to generate a text-to-destination map to map relationships between anchors of the hyperlinks and destinations of the hyperlinks using a website sitemap. In a second example of the system, optionally including the first example, the set of rules includes a maximum allowable number of hyperlinks for a section of text of the electronic document. In a third example of the system, optionally including one or both of the first and second examples, the set of rules includes instructions to extend a first anchor of the hyperlinks to include a second anchor of the hyperlinks when the first anchor and the second anchor are separated by less than a threshold character distance. In a fourth example of the system, optionally including one or more or each of the first through third examples, the set of rules includes instructions to adjust one or more of a frequency of a display of an anchor of the hyperlinks, a formatting of the anchor, and an extent of a portion of a section of text configured as the anchor.

The disclosure also provides support for a method for determining hyperlink placement in an electronic document, comprising: receiving the electronic document, a list of hyperlink destinations, and a set of rules at a processor, the set of rules providing instructions for automatically inserting hyperlinks into the electronic document based on a type of a structural element identified in the electronic document, identifying the type of the structural element in the electronic document using document processing algorithms implemented at the processor, parsing the structural element to generate anchors of the hyperlinks at selected text of the structural element, the anchors linked to corresponding destinations of the list of hyperlink destinations, and displaying the electronic document with the hyperlinks at a display device. In a first example of the method, the method further comprises: modifying the anchors of the hyperlinks based one or more of a pattern and a frequency of the anchors. In a second example of the method, optionally including the first example, modifying the anchors based on the pattern includes adjusting an appearance and/or a destination of the anchors according to one or more of occurrence, keyword, percentage of text of the structural element, character distance, section reset, and a weight or ranking. In a third example of the method, optionally including one or both of the first and second examples, modifying the anchors based on the frequency of the anchors includes selecting a keyword to be and anchor when the keyword appears at a higher frequency than other keywords within a section of the electronic document. In a fourth example of the method, optionally including one or more or each of the first through third examples, modifying the anchors further comprises selecting one of a first destination of a first anchor of the anchors and a second destination of a second anchor of the anchors when the first anchor and the second anchor are combined into a single anchor based on a ranking or weight of the first anchor versus the second anchor. In a fifth example of the method, optionally including one or more or each of the first through fourth examples, the anchors are HTML elements linked to destinations, and wherein the destinations are one of a different document, a different section of the electronic document, and a pop-up.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method for automatically inserting hyperlinks, comprising:
  receiving, at a processor of a server, a set of rules for inserting the hyperlinks into an electronic document based on structural elements of the electronic document;
  identifying structural elements present in the electronic document via an automated tool, the automated tool implemented at the processor and configured to execute insertion of the hyperlinks based on the set of rules;
  matching, at the processor of the server, text of the electronic document to a database of keywords and/or key phrases, the one or more keywords and/or key phrases of the database selected based on the identified structural elements of the electronic document;

inserting the hyperlinks into the electronic document based on the matching of the keywords and/or key phrases and on the identified structural elements;
modifying the hyperlinks, including selecting one of a first destination of a first anchor of the anchors and a second destination of a second anchor of the anchors when the first anchor and the second anchor are combined into a single anchor based on a ranking or weight of the first anchor versus the second anchor; and
displaying the electronic document with the hyperlinks at a display device.

2. The method of claim 1, wherein identifying the structural elements includes identifying one or more of a keyword, a bulleted list, a numbered list, a heading, a paragraph of text, and a table.

3. The method of claim 1, wherein identifying the structural elements includes identifying a keyword or a paragraph of text, and in response to identifying the keyword or paragraph of text in the electronic document, inserting the hyperlinks includes hyperlinking a first occurrence of the keyword in a paragraph of text and not hyperlinking subsequent appearances of the keyword in the paragraph of text.

4. The method of claim 1, wherein identifying the structural elements includes identifying a bulleted list, and in response to identifying the bulleted list in the electronic document, the hyperlinks are inserted into text following bullets in the bulleted list.

5. The method of claim 1, wherein identifying the structural elements includes identifying a numbered list, and in response to identifying the numbered list in the electronic document, the hyperlinks are inserted at text representing items of the numbered list.

6. The method of claim 1, wherein identifying the structural elements includes identifying a heading, and in response to identifying the heading in the electronic document, the hyperlinks are inserted into the heading at keywords of the heading.

7. The method of claim 1, wherein identifying the structural elements includes identifying a table, and in response to identifying the table in the electronic document, the hyperlinks are inserted into a column of the table.

8. The method of claim 1, wherein receiving the set of rules includes receiving preferences input by a user at a user interface communicatively coupled to the processor, and wherein the preferences input by the user includes a placement and a formatting of the hyperlinks specific to a type of the identified structural elements.

9. The method of claim 1, wherein receiving the set of rules includes receiving rules generating using artificial intelligence or machine learning.

10. The method of claim 1, wherein the automated tool is configured to allow applying multiple rules simultaneously.

11. A system for hyperlink insertion, comprising:
a database storing an electronic document;
a display device configured to display the electronic document; and
a processor, communicatively coupled to the display device and including an automated tool configured with executable instructions stored in non-transitory memory that, when executed, cause the processor to:
insert hyperlinks into the electronic document at one or more structural elements identified in the electronic document according to a set of rules included in the executable instructions, the set of rules defining how the hyperlinks are displayed depending on a type of the one or more structural elements;
modify anchors of the hyperlinks by selecting one of a first destination of a first anchor of the anchors and a second destination of a second anchor of the anchors when the first anchor and the second anchor are combined into a single anchor based on a ranking or weight of the first anchor versus the second anchor; and
display the electronic document with the hyperlinks at the display device.

12. The system of claim 11, wherein the set of rules includes instructions to generate a text-to-destination map to map relationships between anchors of the hyperlinks and destinations of the hyperlinks using a website sitemap.

13. The system of claim 11, wherein the set of rules includes a maximum allowable number of hyperlinks for a section of text of the electronic document.

14. The system of claim 11, wherein the set of rules includes instructions to extend a first anchor of the hyperlinks to include a second anchor of the hyperlinks when the first anchor and the second anchor are separated by less than a threshold character distance.

15. The system of claim 11, wherein the set of rules includes instructions to adjust one or more of a frequency of a display of an anchor of the hyperlinks, a formatting of the anchor, and an extent of a portion of a section of text configured as the anchor.

16. A method for determining hyperlink placement in an electronic document, comprising:
receiving the electronic document, a list of hyperlink destinations, and a set of rules at a processor, the set of rules providing instructions for automatically inserting hyperlinks into the electronic document based on a type of a structural element identified in the electronic document;
identifying the type of the structural element in the electronic document using document processing algorithms implemented at the processor;
parsing the structural element to generate anchors of the hyperlinks at selected text of the structural element, the anchors linked to corresponding destinations of the list of hyperlink destinations;
modifying the anchors based on a frequency of the anchors by selecting a keyword to be an anchor when the keyword appears at a higher frequency than other keywords within a section of the electronic document; and
displaying the electronic document with the hyperlinks at a display device.

17. The method of claim 16, further comprising modifying the anchors of hyperlinks based on a pattern of the anchors, wherein modifying the anchors based on the pattern includes adjusting an appearance and/or a destination of the anchors according to one or more of occurrence, keyword, percentage of text of the structural element, character distance, section reset, and a weight or ranking.

18. The method of claim 16, wherein modifying the anchors further comprises selecting one of a first destination of a first anchor of the anchors and a second destination of a second anchor of the anchors when the first anchor and the second anchor are combined into a single anchor based on a ranking or weight of the first anchor versus the second anchor.

19. The method of claim 16, wherein the anchors are HTML elements linked to destinations, and wherein the destinations are one of a different document, a different section of the electronic document, and a pop-up.

20. The method of claim 16, further comprising modifying the anchors based on a type of the structural element.

* * * * *